US011217265B2

(12) United States Patent
Meng et al.

(10) Patent No.: US 11,217,265 B2
(45) Date of Patent: Jan. 4, 2022

(54) CONDITION-INVARIANT FEATURE EXTRACTION NETWORK

(71) Applicant: Microsoft Technology Licensing, LLC, Redmond, WA (US)

(72) Inventors: Zhong Meng, Seattle, WA (US); Yong Zhao, Redmond, WA (US); Jinyu Li, Redmond, WA (US); Yifan Gong, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 272 days.

(21) Appl. No.: 16/434,665

(22) Filed: Jun. 7, 2019

(65) Prior Publication Data

US 2020/0335122 A1    Oct. 22, 2020

Related U.S. Application Data

(60) Provisional application No. 62/834,549, filed on Apr. 16, 2019.

(51) Int. Cl.
| | |
|---|---|
| *G10L 25/03* | (2013.01) |
| *G10L 25/30* | (2013.01) |
| *H04R 29/00* | (2006.01) |
| *G06N 20/00* | (2019.01) |
| *G06F 17/18* | (2006.01) |
| *G06N 3/08* | (2006.01) |
| *H04R 5/04* | (2006.01) |

(52) U.S. Cl.
CPC .............. *G10L 25/03* (2013.01); *G06F 17/18* (2013.01); *G06N 3/08* (2013.01); *G06N 20/00* (2019.01); *G10L 25/30* (2013.01); *H04R 5/04* (2013.01); *H04R 29/002* (2013.01)

(58) Field of Classification Search
None
See application file for complete search history.

(56) References Cited

U.S. PATENT DOCUMENTS

2020/0168230 A1*   5/2020   Roh .................... G10L 17/08

OTHER PUBLICATIONS

Bhattacharya, et al., "Generative Adversarial Speaker Embedding Networks for Domain Robust End-to-End Speaker Verification", In Computing Research Repository, Nov. 7, 2018, 5 Pages.

(Continued)

*Primary Examiner* — Quynh H Nguyen
(74) *Attorney, Agent, or Firm* — Buckley, Maschoff & Talwalkar LLC

(57) ABSTRACT

To generate substantially condition-invariant and speaker-discriminative features, embodiments are associated with a feature extractor capable of extracting features from speech frames based on first parameters, a speaker classifier capable of identifying a speaker based on the features and on second parameters, and a condition classifier capable of identifying a noise condition based on the features and on third parameters. The first parameters of the feature extractor and the second parameters of the speaker classifier are trained to minimize a speaker classification loss, the first parameters of the feature extractor are further trained to maximize a condition classification loss, and the third parameters of the condition classifier are trained to minimize the condition classification loss.

20 Claims, 7 Drawing Sheets

(56) References Cited

OTHER PUBLICATIONS

Fang, et al., "Channel Adversarial Training for Cross-Channel Text-Independent Speaker Recognition", In Computing Research Repository, Feb. 25, 2019, 5 Pages.
Zhou, et al., "Training Multi-Task Adversarial Network For Extracting Noise-Robust Speaker Embedding", In Computing Research Repository, Nov. 23, 2018, 5 Pages.
"International Search Report and Written Opinion Issued in PCT Application No. PCT/US20/020581", dated May 29, 2020, 13 Pages.
Dehak, et al., "Front-end Factor Analysis for Speaker Verification", In Proceedings of IEEE Transactions on Audio, Speech, and Language Processing, vol. 19, No. 4, May 2011, pp. 788-798.
Donahue, et al., "Exploring Speech Enhancement with Generative Adversarial Networks for Robust Speech Recognition", In Proceedings of International Conference on Acoustics, Speech and Signal Processing, Apr. 15, 2018, 6 Pages.
Ganin, et al., "Unsupervised Domain Adaptation by Backpropagation", In Proceedings of the 32nd International Conference on Machine Learning, Jul. 6, 2015, 10 Pages.
Goodfellow, et al., "Generative Adversarial Nets", In Proceedings of Advances in Neural Information Processing Systems, Dec. 8, 2014, pp. 1-9.
Heigold, et al., "End-to-end text-dependent Speaker Verification", In Proceedings of International Conference on Acoustics, Speech and Signal Processing, Mar. 20, 2016, 05 Pages.
Kaneko, et al., "Parallel-Data-Free Voice Conversion Using Cycle-Consistent Adversarial Networks", In the Repository of arXiv:1711.11293, Dec. 20, 2017, 5 Pages.
Li, et al., "Deep Speaker: an end-to-end Neural Speaker Embedding System", In the Repository of arXiv:1705.02304, May 5, 2017, 8 Pages.
Marxer, et al., "The Third Chime Speech Separation and Recognition Challenge: Dataset, Task and Baselines", In Proceedings of IEEE Workshop on Automatic Speech Recognition and Understanding, Dec. 13, 2015, 9 Pages.
Meng, et al., "Adversarial Feature-Mapping for Speech Enhancement", In the Proceedngs of 19th Annual Conference of the International Speech Communication Association, Sep. 2, 2018, 5 Pages.
Meng, et al., "Adversarial Teacher-student Learning for Unsupervised Domain Adaptation", In Proceedings of IEEE International Conference on Acoustics, Speech and Signal Processing, Apr. 2, 2018, 5 Pages.
Meng, et al., "Speaker-invariant Training via Adversarial Learning", In IEEE International Conference on Acoustics, Speech and Signal Processing, Apr. 15, 2018, 5 Pages.
Meng, et al., "Unsupervised Adaptation with Domain Separation Networks for Robust Speech Recognition", In Proceedings of IEEE Automatic Speech Recognition and Understanding Workshop, Dec. 16, 2017, 8 Pages.
Pascual, et al., "Segan: Speech Enhancement Generative Adversarial Network", In Proceedings of 18th Annual Conference of the International Speech Communication Association, Aug. 20, 2017, 5 Pages.
Richardson, et al., "Deep Neural Network Approaches to Speaker and Language Recognition", In Proceedings of IEEE Signal Processing Letters, vol. 22, No. 10, Oct. 2015, pp. 1671-1675.
Saon, et al., "English Conversational Telephone Speech Recognition by Humans and Machines", In Proceedings of arXiv preprint arXiv:1703.02136, Mar. 6, 2017, 7 Pages.
Serdyuk, et al., "Invariant Representations for Noisy Speech Recognition", In Proceedings of the 30th Conference on Neural Information Processing Systems, Dec. 5, 2016, 5 Pages.
Shinohara, Yusuke, "Adversarial Multi-task Learning of Deep Neural Networks for Robust Speech Recognition", In Proceedings of International Speech Communication Association, Sep. 8, 2016, pp. 2369-2372.
Snyder, et al., "Deep Neural Network-based Speaker Embeddings for end-to-end Speaker Verification", In the Proceedings of Spoken Language Technology Workshop, Dec. 13, 2016, 6 Pages.
Snyder, et al., "X-vectors: Robust DNN Embeddings for Speaker Recognition", In International Conference on Acoustics, Speech and Signal Processing, Apr. 15, 2018, 5 Pages.
Sun, et al., "An Unsupervised Deep Domain Adaptation Approach for Robust Speech Recognition", In Journal of Neurocomputing, vol. 257, Sep. 27, 2017, pp. 1-9.
Variani, et al., "Deep Neural Networks for Small Footprint Text-dependent Speaker Verification", In Proceedings of IEEE International Conference on Acoustic, Speech and Signal Processing, May 4, 2014, pp. 4080-4084.
Wang, et al., "Unsupervised Domain Adaptation via Domain Adversarial Training for Speaker Recognition", In Proceedings of International Conference on Acoustics, Speech and Signal Processing, Apr. 15, 2018, 5 Pages.
Zhang, et al., "End-to-End Attention based Text-Dependent Speaker Verification", In Proceedings of Spoken Language Technology Workshop, Dec. 13, 2016, 8 Pages.
Zhao, et al., "Adversarial Speaker Verification", In the Repository of arXiv:1904.1240, Apr. 29, 2019, 5 Pages.

* cited by examiner

CONDITION-INVARIANT FEATURE EXTRACTION NETWORK

CROSS-REFERENCE TO RELATED APPLICATIONS

The present application claims the benefit of U.S. Provisional Patent Application No. 62/834,549 filed Apr. 16, 2019, the entire contents of which are incorporated herein by reference for all purposes.

BACKGROUND

Speaker verification systems are used to authenticate a speaker's identity. Generally, such systems may identify an unknown speaker by determining similarities between a test utterance of the unknown speaker and utterances of known speakers. A speaker verification system is considered text-dependent if the test utterance is a fixed or prompted text phrase and is considered text-independent if the test utterance is unconstrained speech.

Recently-developed speaker verification systems utilize deep embeddings learned from a deep neural network. For example, a deep neural network is trained to classify speakers using a training set of speech recorded from a large number of training speakers. Next, speech recorded from each one of a set of enrollment speakers is input to the trained deep neural network in order to compute deep hidden features for each speaker in the enrollment set. The deep hidden features of each enrollment speaker are averaged to generate a compact deep embedding associated with that speaker.

To verify the identity of an unknown speaker, a test utterance of the unknown speaker is input to the trained deep neural network. A compact deep embedding associated with the unknown speaker is then generated as described above. A cosine distance is computed between the compact deep embedding associated with the unknown speaker and the compact deep embedding associated with each of the enrollment speakers. The distance between the compact deep embedding associated with the unknown speaker and the compact deep embedding associated with an enrollment speaker corresponds to a likelihood that the unknown speaker and the enrollment speaker are the same person.

The deep embeddings extracted from a trained deep neural network are susceptible to noise-related condition variability caused by different background noise environments or signal-to-noise ratios (SNRs). Under these scenarios, the embeddings of the enrolled speakers and the test utterances are mismatched and may lead to degraded speaker verification performance. In fact, the performance of conventional speaker verification systems may degrade if any of the training utterances, the enrollment utterances and the test utterances are recorded in significantly mismatched conditions.

What is needed are efficient systems for generating deep embeddings which are speaker-discriminative and substantially condition-invariant.

DETAILED DESCRIPTION

The following description is provided to enable any person in the art to make and use the described embodiments. Various modifications, however, will remain readily apparent to those of ordinary skill in the art.

Embodiments may address scenarios in which speakers are enrolled using utterances recorded in different conditions (i.e., environments, SNR values, etc.) from those of the training set, and/or in which the test utterances are recorded in different conditions from the training and enrollment sets. Under these scenarios, the embeddings of the enrolled speakers and the test utterances are mismatched and may lead to degraded speaker verification performance because the new conditions for enrollment and testing are unknown to the background deep neural network trained on the training set.

Some embodiments employ adversarial multi-task training to learn a substantially condition-invariant deep features. Generally, for example, a background deep neural speaker classification network and a condition network are jointly optimized to minimize the speaker classification loss, and simultaneously mini-maximize the condition loss. The condition network may be used for condition classification if the conditions are represented by a categorical variable (e.g., environment types) and may be used for condition reconstruction if the conditions are expressed by a continuous variable (e.g., SNR values).

In some embodiments, a background deep neural network, a condition classification network and a condition regression network are jointly optimized to minimize the speaker classification loss, and simultaneously mini-maximize the condition classification loss and mini-maximize the condition reconstruction loss. The condition classification network is used to predict a condition category and to optimize a cross-entropy loss, while the condition regression network is used to reconstruct a continuous condition variable and to optimize a mean-square error loss.

Enrolled speaker utterances and test utterances may be submitted to the background deep neural network trained as described herein, in order to generate condition-invariant and speaker-discriminative features. Condition-invariant and speaker-discriminative embeddings for the enrolled speakers and test speaker may then be generated based on the corresponding condition-invariant and speaker-discriminative features.

Embodiments may improve system robustness by reducing the effects of noise condition variability on speaker verification. Such adversarial speaker verification may suppress the effects of condition variability in speaker modeling in comparison to conventional systems.

Figure 1:
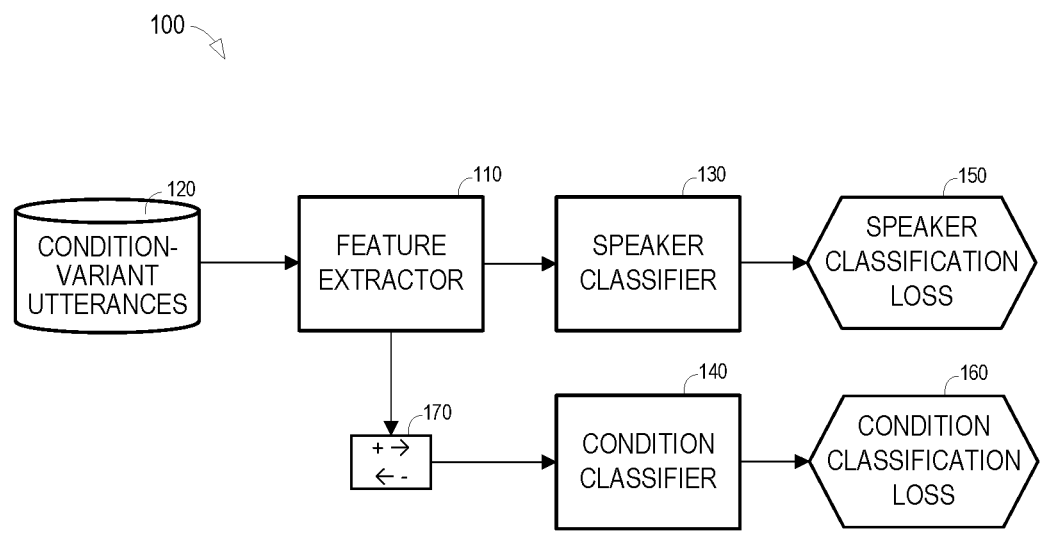
FIG. 1 is a block diagram of a system to train a speaker-discriminative and substantially condition-invariant deep feature extractor for categorical conditions according to some embodiments.

FIG. 1 illustrates system 100 according to some embodiments. System 100 may be used to train feature extractor 110 to learn substantially condition-invariant and speaker-discriminative features. System 100 includes speaker classifier 130 to predict a speaker based on features received from feature extractor 110 and condition classifier 140 to predict a condition category based on the features received from feature extractor 110. A condition category may indicate an environment in which a frame was recorded such as but not limited to classroom noise, street noise, office noise.

During training, feature extractor 110 receives a training set of condition-variant utterances 120 and maps speech frames of utterances 120 to intermediate deep hidden features. Speaker classifier 130 receives the intermediate deep hidden features and maps the features to speaker posteriors. The parameters of feature extractor 110 and speaker classifier 130 are optimized in order to minimize speaker classification loss 150.

Also during training, condition classifier 140 predicts condition category posteriors based on the intermediate deep hidden features received from feature extractor 110. The parameters of condition classifier 140 are optimized in order to minimize condition classification loss 160. However, the parameters of feature extractor 110 are jointly trained with an adversarial objective, which is to maximize condition classification loss 160. Such optimization is based on an understanding that the ability of condition classifier 140 to accurately predict condition categories is inversely related to the condition-invariance of the intermediate deep hidden features received from feature extractor 110.

In some embodiments, feature extractor 110 comprises the first few layers of a background deep neural network as a feature extractor network $M_f$ with parameters $\theta_f$ that maps input speech frames $X=\{x_1, \ldots, x_T\}$, $x_t \in R^{r_x}$, $t=1, \ldots, T$ from a training set to intermediate deep hidden features $F=\{f_1, \ldots, f_T\}$, $f_t \in R^{r_f}$ and speaker classifier 130 comprises the upper layers of the background deep neural network $M_y$ with parameters $\theta_y$ that maps the deep hidden features F to the speaker posteriors $p(\alpha|f_t; \theta_y)$, $\alpha \in A$ as follows:

$$f_t = M_f(x_t)$$

$$p(\alpha|f_t;\theta_y) = M_y(f_t)$$

where A is the set of all speakers in the training set. $\theta_f$ and $\theta_y$ may be optimized by minimizing the cross-entropy loss of speaker classification below:

$$L_{speaker}(\theta_f, \theta_y) = -\frac{1}{T}\sum_{t=1}^{T} \log p(y_t | x_t; \theta_f, \theta_y)$$

$$= -\frac{1}{T}\sum_{t=1}^{T}\sum_{a \in A} 1[a = y_t]\log M_y(M_f(x_t))$$

where $Y=\{y_1, \ldots, y_T\}$, $y_T \in A$ is a sequence of speaker labels aligned with X and $1[\cdot]$ is the indicator function which equals 1 if the condition in the squared bracket is satisfied and 0 otherwise.

Condition classifier 140 may comprise a condition classifier network $M_c$ which predicts the condition posteriors $p(b|f_t; \theta_f)$, $b \in B$ as follows:

$$M_c(f_t) = p(b|f_t;\theta_c) = p(b|x_t;\theta_f,\theta_c)$$

where B is the set of all conditions in the training set. With a sequence of condition labels $C=\{c_1, \ldots, c_T\}$ that is aligned with X, the condition classification loss may be computed in some embodiments through cross-entropy as follows:

$$L_{condition}(\theta_f, \theta_c) = -\frac{1}{T}\sum_{t=1}^{T} \log p(c_t | f_t; \theta_c)$$

$$= -\frac{1}{T}\sum_{t=1}^{T}\sum_{b \in B} 1[b = c_t]\log M_c(M_f(x_t))$$

Figure 2:
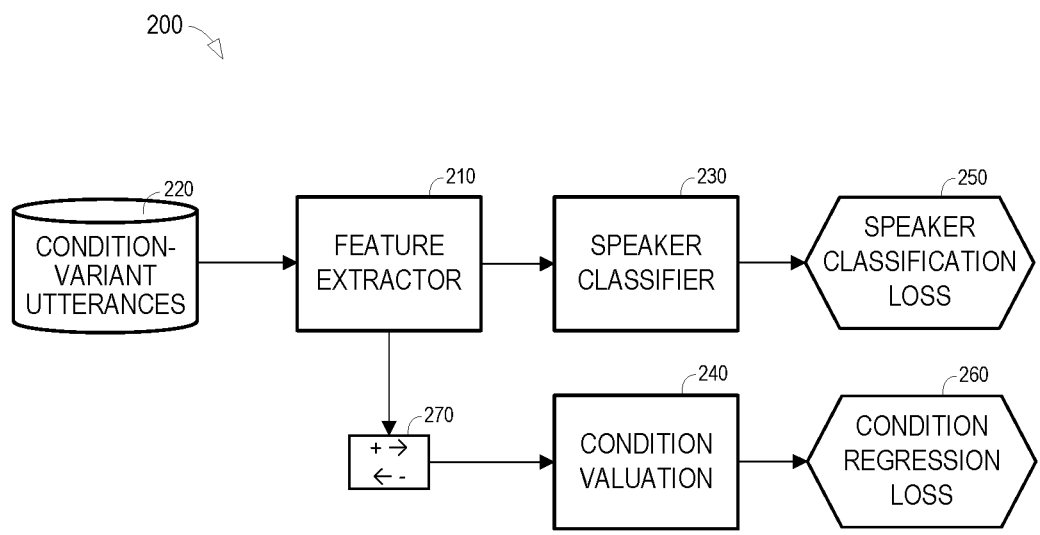
FIG. 2 is a block diagram of a system to train a speaker-discriminative and substantially condition-invariant deep feature extractor for continuous conditions according to some embodiments.

FIG. 2 illustrates system 200 according to some embodiments. System 200 may be used to train feature extractor 210 to learn substantially condition-invariant and speaker-discriminative features. System 200 includes speaker classifier 230 to predict a speaker based on features received from feature extractor 210 and condition valuation network 240 to predict frame-level continuous noise condition values based on the features received from feature extractor 210. Continuous noise conditions are real numbers or real vectors, such as the SNR of each input speech frame.

As described above with respect to system 100, feature extractor 210 receives a training set of condition-variant utterances 220 and maps speech frames of utterances 220 to intermediate deep hidden features. Speaker classifier 130 receives the intermediate deep hidden features and maps the features to speaker posteriors. The parameters of feature extractor 210 and speaker classifier 230 are optimized in order to minimize speaker classification loss 250 (i.e., to maximize performance of speaker classifier 230).

Simultaneously, condition valuation network 240 predicts condition values based on the intermediate deep hidden features received from feature extractor 210. The parameters of condition valuation network 240 are optimized in order to minimize condition regression loss 260. The parameters of feature extractor 210 are jointly trained with the adversarial objective of maximizing condition regression loss 260, with the understanding that the ability of condition valuation network 240 to accurately predict condition values is inversely related to the condition-invariance of the intermediate deep hidden features received from feature extractor 210.

According to some embodiments, condition valuation network 240 is a condition regression network $M_c(f_t)=\hat{c}_t$. Based on a sequence of ground truth condition values $C=\{c_1, \ldots, c_T\}$ that is aligned with X, the condition classification loss may be computed in some embodiments through mean-square error as follows:

$$L_{condition}(\theta_f, \theta_c) = -\frac{1}{T}\sum_{t=1}^{T} (\hat{c}_t - c_t)^2$$

$$= -\frac{1}{T}\sum_{t=1}^{T} [M_c(M_f(x_t)) - c_t]^2$$

Figure 3:
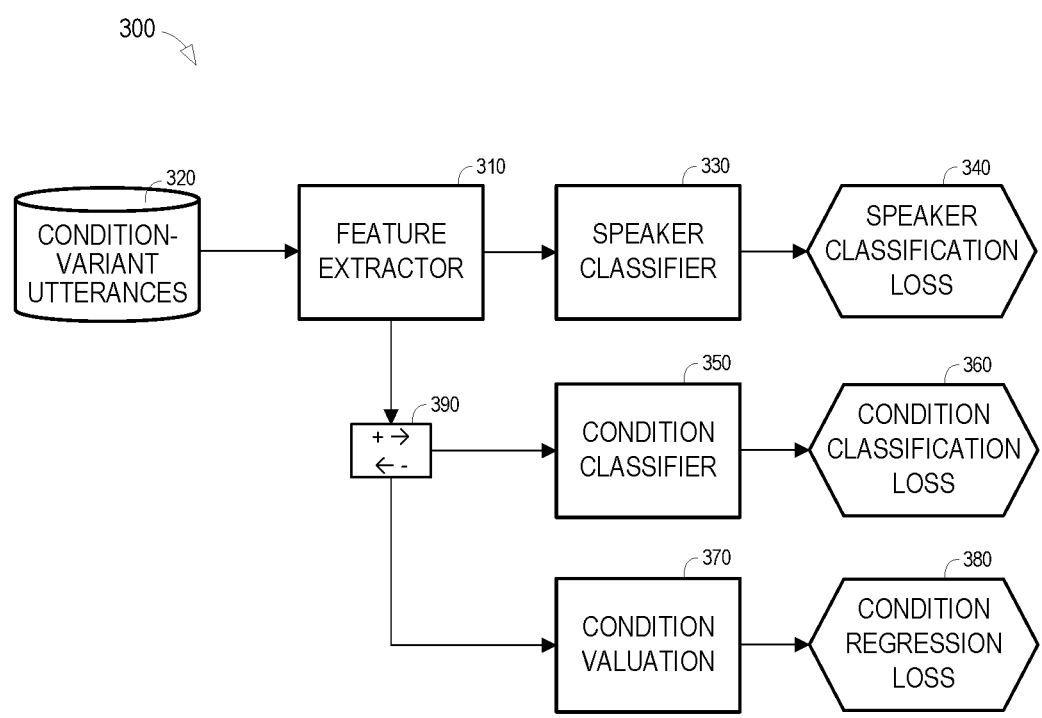
FIG. 3 is a block diagram of a system to train a speaker-discriminative and substantially condition-invariant deep feature extractor according to some embodiments.

FIG. 3 illustrates system 300 according to some embodiments. As shown, System 300 may be used to train feature extractor 310 to learn substantially condition-invariant and speaker-discriminative features by simultaneously training speaker classifier 330 and feature extractor 310 to minimize speaker classification loss 340, training condition classifier 350 to minimize condition classification loss 360 and feature extractor 310 to maximize condition classification loss 360, and training condition valuation network 370 to minimize condition regression loss 370 and feature extractor 310 to maximize condition regression loss 370.

During optimization of each of condition classifier 350 and condition valuation network 370, to make the deep features F condition-invariant, the distributions of the deep features from different conditions should be as close to each other as possible. Therefore, $M_f$ and $M_c$ are jointly trained with an adversarial objective, in which $\theta_f$ is adjusted to maximize the frame-level condition loss $L_{condition}$ while $\theta_c$ is adjusted to minimize $L_{condition}$. This mini-max competition will first increase the discriminativity of $M_c$ and the speaker-invariance of the deep features generated by $M_f$, and will eventually converge to the point where $M_f$ generates extremely confusing deep features that $M_c$ is unable to distinguish. At the same time, the deep features are made speaker-discriminative by minimizing the speaker classification loss $L_{speaker}$ of the equation above.

According to some embodiments, the optimal parameters $\hat{\theta}_y$, $\hat{\theta}_f$, $\hat{\theta}_c$ may be determined through adversarial multi-task learning as follows:

$$(\hat{\theta}_f, \hat{\theta}_y) = \arg\min_{\theta_f, \theta_y} L_{speaker}(\theta_f, \theta_y) - \lambda L_{condition}(\theta_f, \theta_c)$$

$$(\hat{\theta}_c) = \arg\min_{\theta_c} L_{condition}(\hat{\theta}_f, \theta_c)$$

where $\lambda$ controls the trade-off between the speaker classification loss $L_{speaker}$ and the condition loss $L_{condition}$.

The optimization can be implemented through standard stochastic gradient descent by inserting a gradient reversal layer such as component 170, 270 and 390 of systems 100, 200 and 300. The gradient reversal layer serves as an identity transform in forward propagation and multiplies the gradient by $-\lambda$ in the backward propagation.

Figure 4:
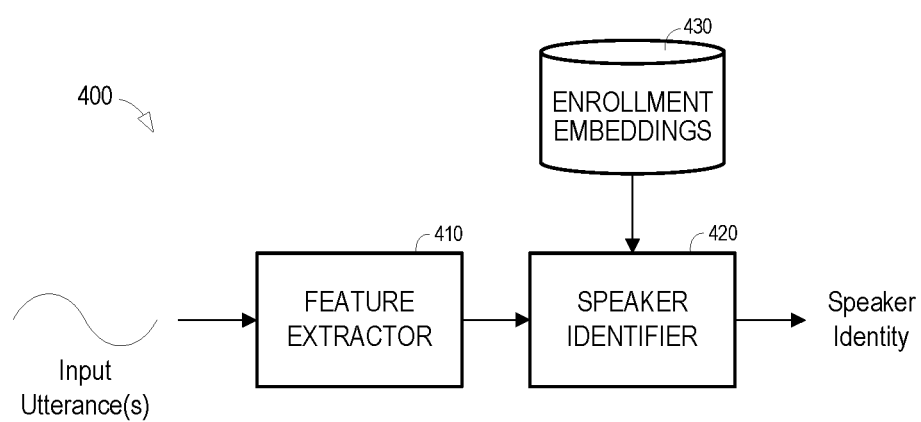
FIG. 4 is a block diagram of a system to verify a speaker's identity using a feature extractor trained in accordance with some embodiments.

As described above, a thusly-trained feature extractor may then be used to perform speaker identification. As shown in FIG. 4, system 400 includes feature extractor 410 trained according to some embodiments.

Feature extractor 410 receives one or more test utterances of an unknown speaker. Feature extractor 410 operates as trained to generate substantially condition-invariant and speaker-discriminative deep hidden features for the unknown speaker. The deep hidden features are averaged to generate a compact deep embedding associated with the unknown speaker.

Speaker identifier 420 computes a similarity between the compact deep embedding associated with the unknown speaker and each compact deep embedding associated with each of several enrollment speakers. The compact deep embeddings associated with the enrollment speakers are previously-generated using trained feature extractor 410 and stored in enrollment embeddings 430. Speaker identifier 420 identifies the unknown speaker as the enrollment speaker whose associated compact deep embedding is most similar to the compact deep embedding associated with the unknown speaker. If none of the stored compact deep embeddings is sufficiently similar to the compact deep embedding associated with the unknown speaker, speaker identifier 420 outputs an indication that the unknown speaker cannot be identified from (i.e., is not one of) the enrollment speakers.

In a specific example of system 400, feature extractor 410 consists of $M_f$ and $M_y$ optimized as described above, and is used for extracting condition-invariant deep embeddings for enrolled speakers and test utterances. Assuming that $X^s = \{x_1^s, \ldots, x_{T_s}^s\}$ is a sequence of speech frames from an enrolled speaker s, we compute deep features $F^s$ given $X^s$ is at the input to feature extractor 410 and use the mean value of $F^s = \{f_1^s, \ldots, f_{T_s}^s\}$ as the condition-invariant speaker embedding $h^s$.

$$h^s = \frac{1}{T_s}\sum_{t=1}^{T_s} f_t^s = \frac{1}{T_s}\sum_{t=1}^{T_s} M_f(x_t^s)$$

where $s \in \$$ and $\$$ is the set of all the enrollment speakers. For a test utterance $X^u = \{x_1^u, \ldots, x_{T_u}^u\}$, the condition-invariant utterance embedding is determined as the mean of the deep features of $F^u = \{f_1^u, \ldots, f_{T_u}^u\}$ obtained by forward-propagating $X^u$.

$$h^u = \frac{1}{T_u}\sum_{t=1}^{T_u} f_t^u = \frac{1}{T_u}\sum_{t=1}^{T_u} M_f(x_t^u)$$

The similarities between the deep compact embeddings of each test utterance $x_t^u$ and the claimed speaker s may be determined based on the cosine distance as follows:

$$\text{score}(s, u) = \frac{{h^s}^\top h^u}{\|h^s\|_2 \|h^u\|_2}$$

Figure 5:
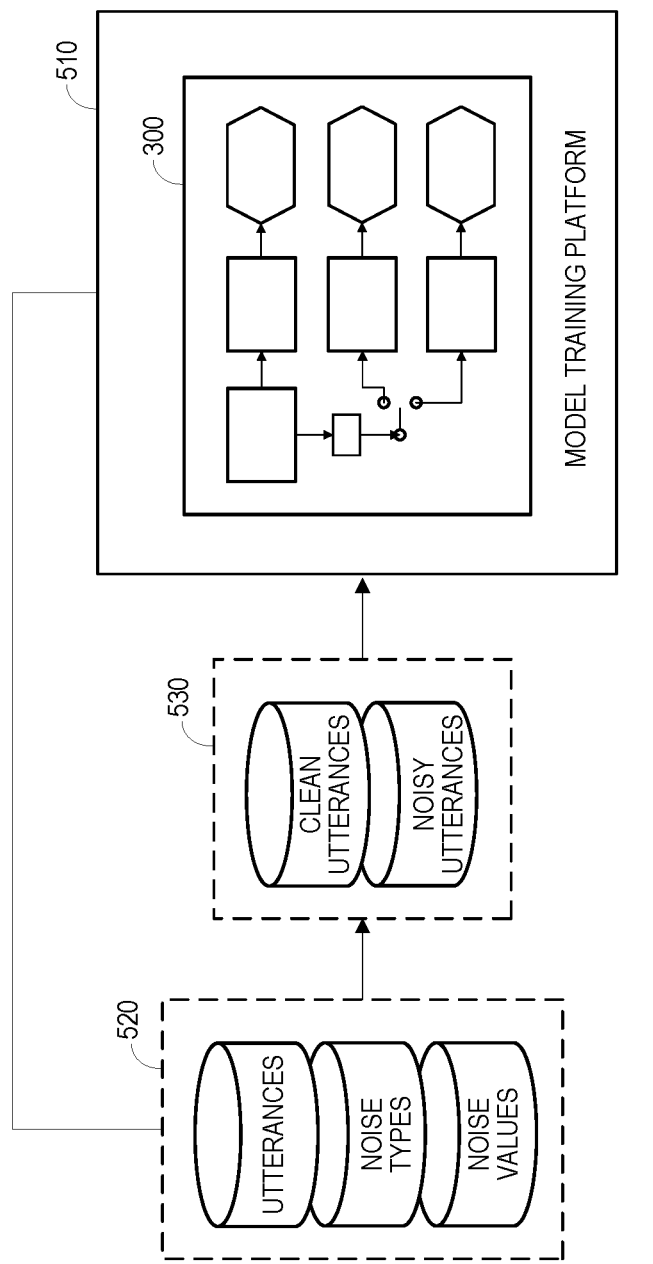
FIG. 5 is a block diagram to illustrate training of a speaker-discriminative and substantially condition-invariant deep feature extractor according to some embodiments.

FIG. 5 illustrates training of a system according to some embodiments. Model training platform 510 may comprise any suitable system to instantiate and train one or more artificial neural networks of any type. In the present example, model training platform 510 implements system 300 of FIG. 3.

Generally, model training platform 510 operates to input training data to system 300, evaluate the resulting output of system 300 (e.g., the classification and condition losses) with respect to training objectives (e.g., minimize classification loss and mini-maximize condition loss), modify parameters of system 300 accordingly, and repeat the process until the training objectives are sufficiently met.

According to some embodiments, the training data is determined based on speech signals and noise data stored in datastore 520. Datastore 520 associates each of a plurality of speakers with one or more pre-captured utterances. The utterances may be audio signals in any format suitable for input to system 300. Datastore 520 also includes noise samples from different types of environments (e.g., café, street junction, bus) and information associated with various noise characteristics (e.g., SNR) which may be used to add noise characteristics having specific values to speech signals.

In one non-exhaustive example, 6.8 M clean utterances are selected from 8 k different speakers for training set 530, where each speaker is associated with 100 to 1000 utterances. Four types of noise from training set 530 the CHiME-3 dataset are added to the 6.8 M utterances to form the noisy utterances of training set 530. The noise is randomly scaled before being added to the clean data to ensure the utterance-level SNR values of simulated training data are within 0 dB to 20 dB.

As the baseline system, a feed-forward deep neural network is trained for speaker classification using 6.8 M utterances from the training set using a cross-entropy criterion as described above. Next, deep embeddings of enrolled speakers and test utterances are extracted for speaker verification as also described above.

In some embodiments, 29-dimensional log Mel filterbank features and 1st and 2nd order delta features (i.e., 87-dimensions in total) are extracted. Each frame is spliced together with 25 left and 25 right context frames to form a 4437-dimensional input feature. The spliced features are fed as the input of the feed-forward deep neural network after global mean and variance normalization. The deep neural network has 5 hidden layers with 2048, 1024, 1024, 512, and 200 hidden units for the bottom to the top hidden layers, respectively. The non-linear activation function for each hidden layer is relu. The output layer of the deep neural network includes 8398 output units corresponding to 8398 speakers in the training set with softmax non-linearity. The 200-dimensional deep embeddings for enrolled speakers and test utterances are computed by taking the average of the last hidden layer outputs.

Adversarial training of the baseline background deep neural network is then performed using 6.8 M utterances of the training set to learn condition-invariant deep embeddings as described above. The feature extractor network ($M_f$) is initialized with the input layer and 5 hidden layers of the previously-trained background deep neural network and the speaker classifier network ($M_y$) is initialized with the previously-trained output layer. The deep hidden feature is the 200-dimensional output of the last hidden layer of the background deep neural network. Training may then be conducted to address the effect of environment variability, which is a factor of categorical noise conditions. The environment classification network ($M_c$) is a feed-forward deep neural network with 2 hidden layers and 512 hidden units for each layer. The output layer of ($M_c$) has 5 units predicting the posteriors of 4 noisy environments and 1 clean environment in the training set.

Training may then be conducted to address SNR variability, a factor of continuous conditions. An SNR regression network ($M_c$) according to some embodiments includes a feed-forward deep neural network with 2 hidden layers and 512 hidden units for each layer. The output layer of $M_c$ includes 1 unit predicting the SNR value of each input speech frame in the training set. Frames in a same utterance share the same utterance-averaged SNR.

A neural network (e.g., deep learning, deep convolutional, or recurrent) according to some embodiments comprises a series of "neurons," such as Long Short-Term Memory (LSTM) nodes, arranged into a network. A neuron is an architecture used in data processing and artificial intelligence, particularly machine learning, that includes memory that may determine when to "remember" and when to "forget" values held in that memory based on the weights of inputs provided to the given neuron. Each of the neurons used herein are configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance are related to one another.

For example, an LSTM serving as a neuron includes several gates to handle input vectors, a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. Neurons and neural networks may be constructed programmatically (e.g., via software instructions) or via specialized hardware linking each neuron to form the neural network.

Figure 6:
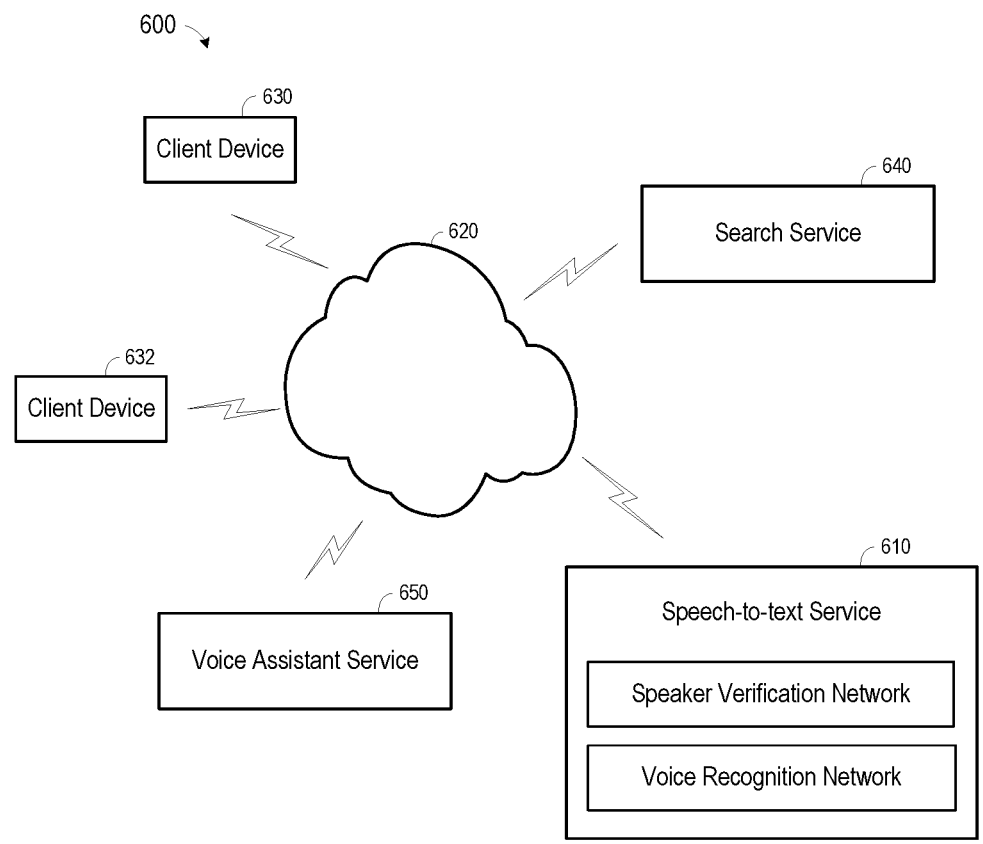
FIG. 6 is a block diagram of a cloud computing system providing meeting transcription according to some embodiments.

FIG. 6 illustrates distributed transcription system 600 according to some embodiments. System 600 may be cloud-based and components thereof may be implemented using on-demand virtual machines, virtual servers and cloud storage instances.

As shown, speech-to-text service 610 may be implemented as a cloud service providing transcription of speech audio signals received over cloud 620. Speech-to-text service 610 may include a speaker verification network trained for condition-invariance and speaker-discriminativity as described above. The speaker verification network may provide a speaker identity to a voice recognition network of speech-to-text service 610 in order to improve the performance of the voice recognition network.

Each of client devices 630 and 632 may be operated to request services such as search service 640 and voice assistant service 650. Services 640 and 650 may, in turn, request speech-to-text functionality from speech-to-text service 610.

Figure 7:
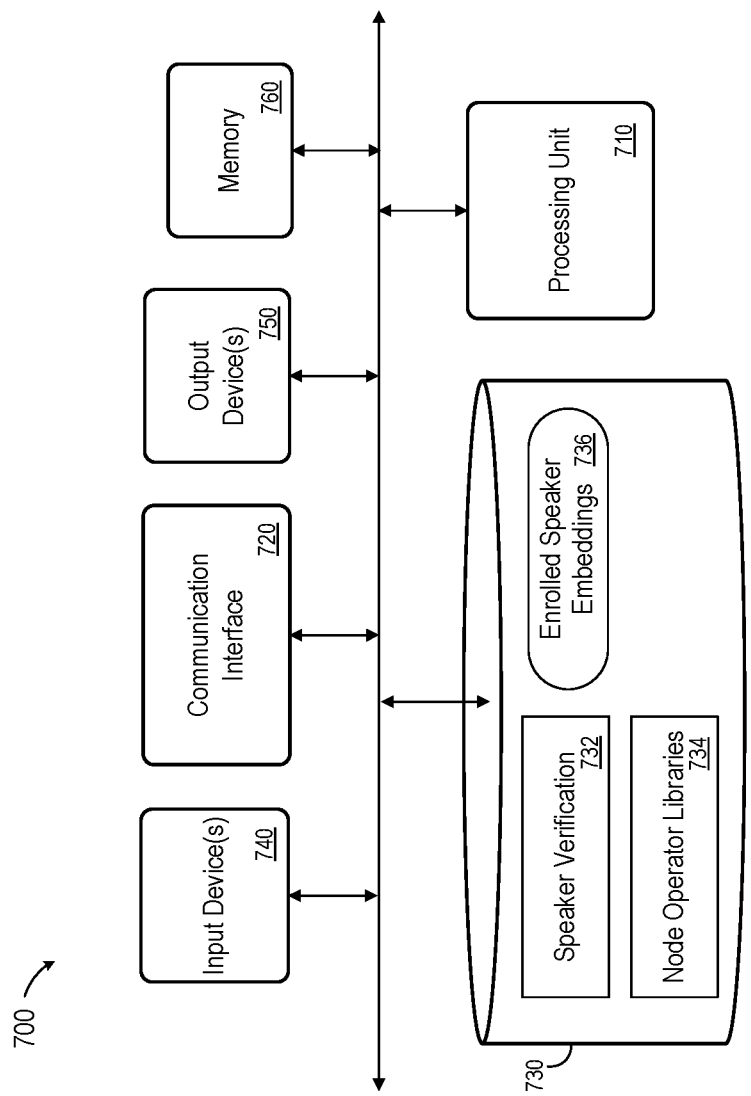
FIG. 7 is a block diagram of a system to verify a speaker's identity according to some embodiments.

FIG. 7 is a block diagram of system 700 according to some embodiments. System 700 may comprise a general-purpose server computer and may execute program code to provide a speaker verification service as described herein. System 700 may be implemented by a cloud-based virtual server according to some embodiments.

System 700 includes processing unit 710 operatively coupled to communication device 720, persistent data storage system 730, one or more input devices 740, one or more output devices 750 and volatile memory 760. Processing unit 710 may comprise one or more processors, processing cores, etc. for executing program code. Communication interface 720 may facilitate communication with external devices, such as client devices, and data providers as described herein. Input device(s) 740 may comprise, for example, a keyboard, a keypad, a mouse or other pointing device, a microphone, a touch screen, and/or an eye-tracking device. Output device(s) 750 may comprise, for example, a display (e.g., a display screen), a speaker, and/or a printer.

Data storage system 730 may comprise any number of appropriate persistent storage devices, including combinations of magnetic storage devices (e.g., magnetic tape, hard disk drives and flash memory), optical storage devices, Read Only Memory (ROM) devices, etc. Memory 760 may comprise Random Access Memory (RAM), Storage Class Memory (SCM) or any other fast-access memory.

Speaker verification network 732 may comprise program code executed by processing unit 710 to cause system 700 to verify speaker identity using substantially condition-invariant and speaker-discriminative deep features as described herein. Node operator libraries 734 may comprise program code to execute functions of a neural network nodes based on trained parameter values as described herein. Enrolled speaker embeddings 736 may be generated using feature extraction layers of speaker verification network 732 as described above. Enrolled speaker embeddings 732 may be compared against deep embeddings of an unknown speaker to perform speaker verification as described. Data storage device 730 may also store data and other program code for providing additional functionality and/or which are necessary for operation of system 700, such as device drivers, operating system files, etc.

Each functional component and process described herein may be implemented at least in part in computer hardware, in program code and/or in one or more computing systems executing such program code as is known in the art. Such a computing system may include one or more processing units which execute processor-executable program code stored in a memory system.

Processor-executable program code embodying the described processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Embodiments are not limited to the examples described below.

The foregoing diagrams represent logical architectures for describing systems according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

The diagrams described herein do not imply a fixed order to the illustrated methods, and embodiments may be practiced in any order that is practicable. Moreover, any of the methods described herein may be performed by hardware, software, or any combination of these approaches. For example, a computer-readable storage medium may store thereon instructions which when executed by a machine result in performance of methods according to any of the embodiments described herein.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
a processing unit; and
a memory storage device including program code that when executed by the processing unit causes to the system to:
instantiate a feature extractor to receive speech frames and extract features from the speech frames based on first parameters of the feature extractor;
instantiate a speaker classifier to identify a speaker based on the features extracted by the feature extractor and on second parameters of the speaker classifier;
instantiate a condition valuation network to determine a noise-related value based on the features extracted by the feature extractor and on third parameters of the condition valuation network;
determine a speaker classification loss associated with the speaker classifier;
determine a condition regression loss associated with the condition valuation network;
train the first parameters of the feature extractor and the second parameters of the speaker classifier to minimize the speaker classification loss;
train the first parameters of the feature extractor to maximize the condition regression loss; and
train the third parameters of the condition valuation network to minimize the condition regression loss.

2. The system of claim 1, wherein training of the first parameters of the feature extractor and the second parameters of the speaker classifier to minimize the speaker classification loss, training of the first parameters of the feature extractor to maximize the condition regression loss, and training of the third parameters of the condition classifier to minimize the condition regression loss occur substantially simultaneously.

3. The system of claim 1, wherein identification of a noise condition comprises determination of a posterior associated with each of a plurality of noise environments, and
wherein determination of a speaker classification loss comprises determination of a posterior associated with each of a plurality of test speakers.

4. The system of claim 1, the program code when executed by the processing unit causes the system to:
instantiate a condition classifier to identify a noise condition based on the features extracted by the feature extractor and on fourth parameters of the condition valuation network;
determine a condition classification loss associated with the condition classifier;
train the first parameters of the feature extractor to maximize the condition classification loss; and
train the fourth parameters of the condition classifier to minimize the condition classification loss.

5. The system of claim 4, wherein training of the first parameters of the feature extractor and the second parameters of the speaker classifier to minimize the speaker classification loss, training of the first parameters of the feature extractor to maximize the condition classification loss, training of the third parameters of the condition valuation network to minimize the condition regression loss, training of the first parameters of the feature extractor to maximize the condition regression loss, and training of the fourth parameters of the condition classifier to minimize the condition classification loss occur substantially simultaneously.

6. The system of claim 4, wherein identification of a noise condition comprises determination of a posterior associated with each of a plurality of noise environments, and
wherein determination of a speaker classification loss comprises determination of a posterior associated with each of a plurality of test speakers.

7. The system of claim 1, the program code when executed by the processing unit causes the system to:
input speech frames of a plurality of enrollment speakers to the feature extractor to extract features associated with each of the plurality of enrollment speakers based on the trained first parameters;
input speech frames of a test speaker to the feature extractor to extract features associated with the test speaker based on the trained first parameters; and
determine an identify of the test speaker based on similarities between the features associated with the test speaker and the features associated with each of the plurality of enrollment speakers.

8. A computer-implemented method comprising:
receiving speech frames at a feature extractor capable of extracting features from the speech frames based on first parameters of the feature extractor;
receiving features extracted by the feature extractor at a speaker classifier capable of identifying a speaker based on the received features and on second parameters of the speaker classifier;
receiving features extracted by the feature extractor at a condition valuation network capable of determining a noise-related value based on the received features and on third parameters of the condition valuation network;
training the first parameters of the feature extractor and the second parameters of the speaker classifier to minimize a speaker classification loss associated with the speaker classifier;
training the first parameters of the feature extractor to maximize a condition regression loss associated with the condition valuation network; and
training the third parameters of the condition valuation network to minimize the condition regression loss.

9. The method of claim 8, wherein training of the first parameters of the feature extractor and the second parameters of the speaker classifier to minimize the speaker classification loss, training of the first parameters of the feature extractor to maximize the condition regression loss, and training of the third parameters of the condition valuation network to minimize the condition regression loss occur substantially simultaneously.

10. The method of claim 8, wherein identifying a noise condition comprises determining a posterior associated with each of a plurality of noise environments, and
wherein determining a speaker classification loss comprises determining a posterior associated with each of a plurality of test speakers.

11. The method of claim 8, further comprising:
receiving features extracted by the feature extractor at a condition classifier capable of identifying a noise condition based on the features extracted by the feature extractor and on fourth parameters of the condition classifier;
training the first parameters of the feature extractor to maximize a condition classification loss associated with the condition classifier; and
training the fourth parameters of the condition classifier to minimize the condition classification loss.

12. The method of claim 11, wherein training of the first parameters of the feature extractor and the second parameters of the speaker classifier to minimize the speaker classification loss, training of the first parameters of the feature extractor to maximize the condition classification loss, training of the third parameters of the condition valuation network to minimize the condition regression loss, training of the first parameters of the feature extractor to maximize the condition regression loss, and training of the fourth parameters of the condition classifier to minimize the condition classification loss occur substantially simultaneously.

13. The method of claim 11, wherein identifying a noise condition comprises determining a posterior associated with each of a plurality of noise environments, and
wherein determining a speaker classification loss comprises determining a posterior associated with each of a plurality of test speakers.

14. The method of claim 8, further comprising:
inputting speech frames of a plurality of enrollment speakers to the feature extractor to extract features associated with each of the plurality of enrollment speakers based on the trained first parameters;
inputting speech frames of a test speaker to the feature extractor to extract features associated with the test speaker based on the trained first parameters; and
determining an identify of the test speaker based on similarities between the features associated with the test speaker and the features associated with each of the plurality of enrollment speakers.

15. A non-transient, computer-readable medium storing program code to be executed by a processing unit to provide:
a feature extractor to receive speech frames and extract features from the speech frames based on first parameters of the feature extractor;
a speaker classifier to identify a speaker based on the features extracted by the feature extractor and on second parameters of the speaker classifier;
a condition valuation network to determine a noise-related value based on the features extracted by the feature extractor and on third parameters of the condition valuation network;
a training platform to:
determine a speaker classification loss associated with the speaker classifier;
determine a condition regression loss associated with the condition valuation network;
train the first parameters of the feature extractor and the second parameters of the speaker classifier to minimize the speaker classification loss;
train the first parameters of the feature extractor to maximize the condition regression loss; and
train the third parameters of the condition valuation network to minimize the condition regression loss.

16. The medium of claim 15, wherein training of the first parameters of the feature extractor and the second parameters of the speaker classifier to minimize the speaker classification loss, training of the first parameters of the feature extractor to maximize the condition regression loss, and training of the third parameters of the condition valuation network to minimize the condition regression loss occur substantially simultaneously.

17. The medium of claim 15, wherein identification of a noise condition comprises determination of a posterior associated with each of a plurality of noise environments, and
wherein determination of a speaker classification loss comprises determination of a posterior associated with each of a plurality of test speakers.

18. The medium of claim 15, the program code to be executed by a processing unit to provide:
a condition classifier to identify a noise condition based on the features extracted by the feature extractor and on fourth parameters of the condition classifier,
wherein the training platform is to:
determine a condition classification loss associated with the condition classifier;
train the first parameters of the feature extractor to maximize the condition classification loss; and
train the fourth parameters of the condition classifier to minimize the condition classification loss.

19. The medium of claim 18, wherein training of the first parameters of the feature extractor and the second parameters of the speaker classifier to minimize the speaker classification loss, training of the first parameters of the feature extractor to maximize the condition classification loss, training of the third parameters of the condition valuation network to minimize the condition regression loss, training of the first parameters of the feature extractor to maximize the condition regression loss, and training of the fourth parameters of the condition classifier to minimize the condition classification loss occur substantially simultaneously.

20. The medium of claim 19, wherein identification of a noise condition comprises determination of a posterior associated with each of a plurality of noise environments, and
    wherein determination of a speaker classification loss comprises determination of a posterior associated with each of a plurality of test speakers.

* * * * *